(12) United States Patent
Kozaki et al.

(10) Patent No.: US 7,377,959 B2
(45) Date of Patent: May 27, 2008

(54) PROCESS AND APPARATUS FOR DECOMPOSITION TREATMENT OF VOLATILE CHLORINATED ORGANIC COMPOUND

(75) Inventors: Shinya Kozaki, Tokyo (JP); Akihito Hosaka, Ayase (JP); Keisuke Miyamura, Miura-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 439 days.

(21) Appl. No.: 11/267,128

(22) Filed: Nov. 7, 2005

(65) Prior Publication Data

US 2006/0096850 A1    May 11, 2006

(30) Foreign Application Priority Data

Nov. 9, 2004    (JP) .............................. 2004-325098

(51) Int. Cl.
*A62D 3/00*    (2007.01)
*C07C 19/00*   (2006.01)
*B01J 19/12*   (2006.01)

(52) U.S. Cl. ............................ 95/142; 96/134; 96/145; 210/670; 210/754; 210/192; 210/241; 423/240 S

(58) Field of Classification Search .................... 95/90, 95/142, 148; 96/134, 135, 145; 210/670, 210/673, 690, 754, 170.07, 192, 241, 908; 423/240 R, 240 S; 62/617; 405/128.75
See application file for complete search history.

(56) References Cited

U.S. PATENT DOCUMENTS

| | | | | |
|---|---|---|---|---|
| 5,198,001 A | * | 3/1993 | Knebel et al. ................. | 95/141 |
| 5,496,395 A | * | 3/1996 | Yamazaki ..................... | 96/123 |
| 5,531,901 A | * | 7/1996 | Miyabe et al. ............... | 210/668 |
| 5,779,768 A | * | 7/1998 | Anand et al. .................. | 95/99 |
| 5,813,799 A | * | 9/1998 | Calcote et al. ......... | 405/128.25 |
| 5,904,750 A | * | 5/1999 | Cowles ......................... | 95/109 |
| 6,444,015 B2 | | 9/2002 | Kato ............................ | 95/143 |
| 6,458,185 B1 | * | 10/2002 | Reiter et al. ................... | 95/115 |
| 6,464,884 B1 | * | 10/2002 | Gadgil ......................... | 210/748 |
| 6,497,795 B1 | | 12/2002 | Kato ........................ | 204/157.3 |
| 2005/0109207 A1 | * | 5/2005 | Olander et al. ............... | 95/141 |

FOREIGN PATENT DOCUMENTS

JP    2001-137697    5/2001
JP    2002-1062     1/2002

* cited by examiner

*Primary Examiner*—Frank M Lawrence
(74) *Attorney, Agent, or Firm*—Fitzpatrick, Cella, Harper & Scinto

(57) ABSTRACT

A large amount of a medium containing a volatile chlorinated organic compound (VOC) with a low concentration is passed through an adsorber filled with an adsorbent which adsorb and desorb the VOC to collect the VOC in the medium in the adsorber; a gas containing water vapor is then brought into contact with the adsorbent to desorb and discharge the VOC from the adsorber; the desorbed gas is cooled to condense the VOC and water; a small amount of the VOC with a high concentration vaporized from the condensate is further irradiated with light in the presence of chlorine to decompose the VOC; and the decomposed product is subsequently treated. This constitution can allow a large amount of the VOC with a low concentration to be irradiated with light in the presence of chlorine to efficiently treat the VOC.

34 Claims, 6 Drawing Sheets

PROCESS AND APPARATUS FOR DECOMPOSITION TREATMENT OF VOLATILE CHLORINATED ORGANIC COMPOUND

BACKGROUND OF THE INVENTION

1. Field of the Invention

The present invention relates to environmental cleanup of soil, underground water and atmospheric air which are polluted with the volatile chlorinated organic compound, and decomposition treatment of a volatile chlorinated organic compound generated in the industrial activities.

2. Related Art

A large amount of a volatile chlorinated organic compound (including chlorinated ethylene, chlorinated methane and the like, and hereafter abbreviated as, "VOC"), which was used at one time in industrial activities, has polluted soil and underground water, and require a great effort for purifying them. However, the VOC is still continuously used at present and continues polluting the air environment.

As for a process of effectively decomposing the VOC existing in such environments, a process of mixing a gas containing the VOC extracted from polluted soil, underground water and air, with a chlorine gas, and irradiating the gas mixture with light is proposed (Japanese Patent Application Laid-Open No. 2001-137697).

In addition, a process of decomposing the VOC adsorbed in an adsorbent by the same decomposing mechanism as in Japanese Patent Application Laid-Open No. 2001-137697 is proposed (Japanese Patent Application Laid-Open No. 2002-1062). The process includes the steps of: at first, adsorbing the VOC in a gas to be treated into an adsorbent such as activated carbon; subsequently, contacting the adsorbent with water vapor to desorb the VOC from the adsorbent; further condensing the water vapor; then, mix the condensate with a hypochlorous acid solution; and aerating a mixed solution, while irradiating it with light, to decomposes the VOC existing in the mixed solution.

In a process of decomposing a VOC through a decomposing mechanism of mixing chlorine with the VOC and irradiating it with light, according to Japanese Patent Application Laid-Open No. 2001-137697, the higher is a concentration of the VOC in a gas to be treated, the less is an amount of necessary chlorine per an amount of the VOC. The reason is considered to be that desorbed chlorine by the decomposition of the VOC also contributes to decomposition as well as charged chlorine, and that because the reaction uses a radical chain reaction, the higher is the concentration of chlorine existing in a reaction field, the more improved is a reaction efficiency. On the contrary, when the concentration of the VOC in a gas to be treated is low, an amount of necessary chlorine per an amount of the VOC largely increases to extremely decrease the treatment efficiency.

In general, in the case of soil and/or ground water pollution, pollutants which have penetrated into the underground from a polluted part diffuse to a wide area of the underground by an effect of the underground water, to pollute the wide area at a low concentration. For this reason, when the VOC is intended to be extracted from such a polluted site, a large amount of but a low concentration of the gas is extracted. When the gas is treated by optical function water, there has been a problem of increasing a treatment cost. The problem is to be solved also in air pollution and a VOC effluent gas produced in industrial activities.

A system according to Japanese Patent Application Laid-Open No. 2002-001062 includes the steps of temporarily collecting a VOC gas in an adsorbent; then desorbing the VOC from the adsorbent to obtain condensate containing the VOC with a high concentration; and subjecting the condensate to decomposition treatment. Accordingly, the above-described VOC-decomposition process can be applied to treatment for a large amount of a VOC gas having a low concentration.

However, though the above-described VOC-decomposing process needs to mix chlorine having a concentration corresponding teethe concentration of the VOC to be treated, with a gas to be treated, the process according to Japanese Patent Application Laid-Open No. 2002-1062 has problems that a concentration ratio of a VOC vaporized from condensate to chlorine is hardly controlled to a suitable ratio for a decomposition condition, because in the process, aeration is performed after a hypochlorous acid solution which is a chlorine evolution source has been mixed with condensate, and that the VOC gas to be treated cannot acquire so high concentration, because a large quantity of the aerating gas needs to be used for vaporizing the VOC from the condensate. The above process also has the problem of needing a long period of time for enabling an adsorbent which has desorbed a VOC to be used again (which is called "regeneration"), because the decomposition treatment cannot be started before the VOC completely desorbs from the adsorbent.

The present invention has been designed with respect to the above-described problems, and is directed at more efficiently treating a large amount of the VOC having a low concentration with a VOC-decomposing process of irradiating the VOC with light in the presence of chlorine.

SUMMARY OF THE INVENTION

As a result of extensive effort for solving the above-described problems, the present inventors found that the concentration of chlorine to be mixed can be controlled in accordance with the concentration of a VOC by collecting a large amount of the VOC with a low concentration in an adsorbent, desorbing the VOC from the adsorbent with the use of water vapor, vaporizing the VOC from a condensate of the water vapor by aeration, mixing chlorine with the VOC gas, and irradiating the mixture with light; that the VOC with a high concentration can be subjected to decomposition treatment by aerating the condensate while heating it; and that the VOC can be simultaneously decomposed and desorbed by simultaneously and continuously carrying out desorption, condensation of the water vapor, the vaporization of the VOC, and the decomposition of the VOC. The present invention has been accomplished based on the above finding Specifically, the present invention provides,a process for treating a VOC in which the VOC contained in a medium is decomposed in presence of chlorine by irradiation with light, including:

a collection step of passing a medium containing the VOC through an adsorber filled with an adsorbent for adsorbing the VOC to collect the VOC in the adsorber;

a desorption step of bringing a gas containing at least water vapor into contact with the adsorbent in the adsorber to desorb the VOC from the adsorber with the collected VOC;

a condensation step of discharging, from the adsorber, a gas containing the water vapor and the VOC produced in the desorption step, and subsequently cooling the gas to obtain a condensate containing the VOC and water;

a vaporization step of vaporizing the VOC from the condensate;

a decomposition step of mixing the gas containing the VOC produced in the vaporization step with chlorine gas, and irradiating the gas mixture with light to decompose the VOC in the gas mixture; and a decomposed product treatment step of carrying out decomposition treatment of a decomposed product of the VOC generated in the VOC decomposition step.

In the above-described decomposition treatment process of the present invention, it is preferable that the above-described vaporization step includes vaporizing the VOC from the condensate by aerating and heating the condensate.

In the above-described decomposition treatment process of the present invention, it is preferable that the above-described desorption step, condensation step, vaporization step and decomposition step are simultaneously and continuously carried out.

Further, the present invention provides an apparatus of treating a VOC by irradiating the VOC contained in a medium with light in presence of chlorine to decompose the VOC, including:

a collecting means for passing a medium containing a VOC through an adsorber filled with an adsorbent for adsorbing the VOC to collect the VOC in the adsorber;

a desorption means for bringing a gas containing at least water vapor into contact with the adsorbent in the adsorber to desorb the VOC from the adsorber with the collected VOC;

a condensation means for discharging, from the adsorber, the gas containing the water vapor and the VOC produced in the desorption step and subsequently cooling the gas to obtain a condensate containing the VOC and water;

a vaporization means for vaporizing the VOC from the condensate;

a decomposition means for mixing the gas containing the VOC produced in the vaporization step, with chlorine gas, and irradiating the gas mixture with light to decompose the VOC in the gas mixture; and a decomposed product treatment means for carrying out decomposition treatment of a decomposed product of the VOC generated by the decomposition means.

In the treatment process of decomposing the VOC by irradiating it with light in the presence of chlorine according the present invention, it is possible to convert a large amount of the VOC with a low concentration to a small amount of the VOC gas with a high concentration, add chlorine in an amount according to the concentration of the VOC gas before subjecting the mixture to the decomposition treatment, thereby making it possible to efficiently decompose a large amount of the VOC with a low concentration in a short time by using a small amount of chlorine. The treatment process also can decompose and desorb the VOC simultaneously, and accordingly can quickly regenerate an adsorber.

Other features and advantages of the present invention will be apparent from the following description taken in conjunction with the accompanying drawings.

DETAILED DESCRIPTION OF THE PREFERRED EMBODIMENTS

A representative embodiment of the present invention will be now described below with reference to the drawings.

Figure 1:
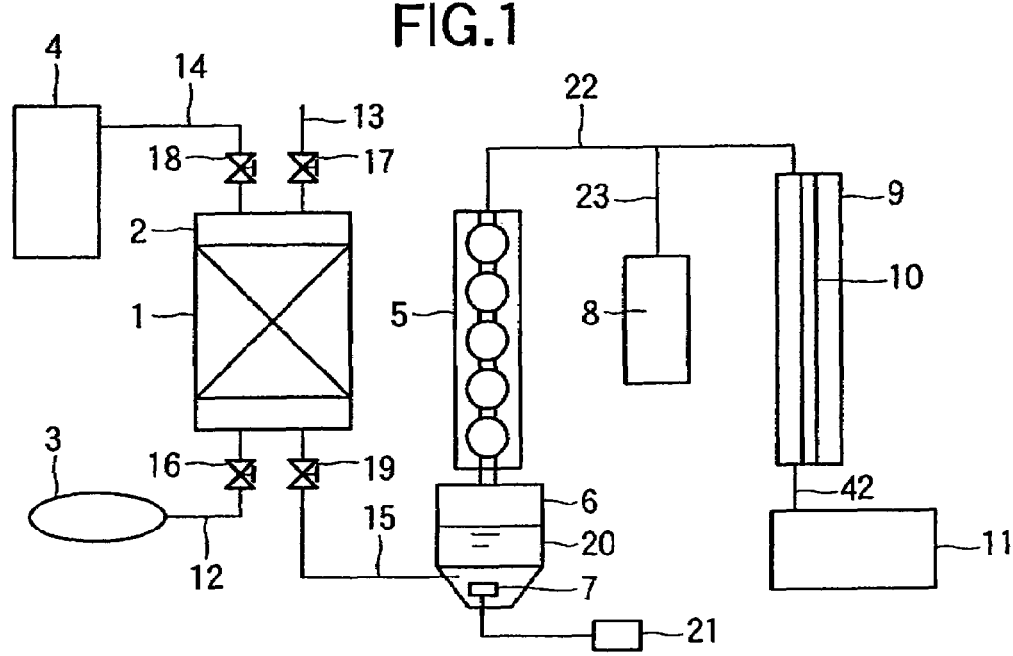
FIG. 1 is a schematic view of a decomposition treatment apparatus according to one embodiment of the present invention.

FIG. 1 shows a system of desorbing a VOC from an adsorber with water vapor and decomposing the VOC.

The system includes at least an adsorber 2 filled with an adsorbent 1 capable of adsorbing and desorbing a VOC; means 3 for supplying a medium containing the VOC to the adsorber 2; a water vapor feeder 4 for supplying water vapor to the adsorber 2; a condenser 5 for condensing the water vapor containing the desorbed VOC; a receiver 6 for storing condensate 20; a gas diffusing pipe 7 for exposing a gas to the condensate; a chlorine-generating unit 8; a reaction tank 9 for irradiating the gas mixture of the VOC gas and chlorine with light; a light-emitting unit 10 for irradiating the reaction tank with light; and a decomposed product treatment tank 11.

The treatment with the use of the system is carried out, for instance, as described below.

At first, pipes 12 and 13 are connected to an adsorber 2. At this time, the pipes 14 and 15 are not yet connected. A medium 3 containing a VOC is introduced into the adsorber 2 from the pipe 12 of which the valve 16 is opened. The VOC in the medium is adsorbed by an adsorbent 1, and the medium from which the VOC has been removed is discharged from the pipe 13 of which the valve 17 is opened to an outside. The valves 16 and 17 are closed before the VOC breaks through the adsorbent 1, and the collection of the VOC to the adsorber 2 is finished. The above-described step is called a collection step. Subsequently, the pipe 12 is separated from the adsorber 2 as needed, then the pipes 14 and 15 are connected to the adsorber 2, water vapor is supplied to the adsorber 2, through the pipe 14 of which the valve 18 is opened, from the water vapor feeder 4, and the VOC adsorbed in the adsorbent 1 is desorbed by the water vapor. The water vapor containing the VOC is introduced to the condenser 5, through the pipe 15 of which the valve 19 is opened and through a receiver 6, is then converted into the condensate 20 containing the VOC by cooling and liquefying by the condenser 5. The condensate 20 is stored in the receiver 6 which is connected to the condenser 5. The above-described step is called a condensation step. After a constant amount of the condensate 20 is stored, the condensate 20 is aerated to air through the air-diffusing pipe with the use of a blower 21, and vaporizes the VOC in the condensate. An aerating gas containing the VOC passes through the condenser 5 and flows in the pipe 22. The above-described step is called a vaporization step. Subsequently, chlorine is supplied to the pipe 22 through a pipe 23 from a chlorine-generating unit 8, and meets and is mixed with the exposure gas which has passed through the pipe 22. The gas mixture is introduced into a reaction tank 9. The gas mixture of the VOC and chlorine in the reaction tank 9 is irradiated with light having a particular wavelength and particular strength emitted from a light-emitting unit 10, whereby the VOC is decomposed. The above-described step is called a decomposition step. A decomposed product generated in the decomposition step is introduced into a decomposed product treatment tank 11 through the pipe 42, and is decomposition-treated therein.

Each of the above steps is not always started after a previous-step has been finished. Each step can be simultaneously carried in parallel to another step.

The above-described example is a basic system, but in the present invention, some different processes can be further selected in each step in accordance with conditions. Now, each step will be further described in detail below.

[Collection Step]

A gas and a liquid can be used for a medium containing a VOC in a collection step. The gas includes, for instance, a vacuum-extracted gas from polluted soil, an aerating gas of polluted underground water, atmospheric air polluted by VOC, a VOC-containing exhaust gas, and air in a VOC-operating atmosphere. The liquid includes, for instance, polluted underground water, polluted river and lake water, a leaching solution from a disposal place, and a VOC-containing waste liquid.

A substance to be decomposed, to which the process according to the present invention can be applied, includes, for instance, chlorinated ethylene. The substance specifically includes a mono to tetra chlorinated ethylene, in other words, chloroethylene, dichloroethylene (DCE), trichloroethylene (TCE) and tetrachloroethylene (PCE). Dichloroethylene further includes, for instance, 1,1-dichloroethylene (vinylidene chloride), cis-1,2-dichloroethylene and trans-1,2-dichloroethylene.

It is preferable that an adsorbent filled in an adsorber is superior in an adsorption rate for a VOC and the adsorption capacity, and further easily releases the adsorbed VOC by heat, decompression and azeotropy.

Such a type of an adsorbent can be selected from activated carbon, zeolite and silica gel, but are not limited thereto in particular.

As for the size and shape of the adsorbent, the adsorbent preferably has such a particle diameter and a shape that when the adsorbent is filled in an adsorber and a medium is passed through the adsorber, the adsorbent can cause a pressure loss within an extent of obtaining a desired flow-in rate of the medium.

Any shape for an adsorber is acceptable, but a shape of making a medium supplied from one end sent to the other end as in a laminar flow as possible, like a cylindrical shape, is preferable. In addition, the adsorber is not always limited to one, but a plurality of adsorbers can be connected in series or parallel to miniaturize each adsorber and facilitate handling such as transportation and placement. When a plurality of the adsorbers are connected in series, it is possible to disconnect the adsorber one by one in order from the upstream adsorber after every constant period of time, while passing a polluted medium through the other adsorbers, desorb the VOC from the disconnected adsorber and connect the disconnected adsorber after desorption to the most downstream part of the adsorbers. Thereby, the VOC can be efficiently desorbed from the adsorber having the largest adsorbed amount of the VOC.

[Desorption Step]

A usable process of desorbing a VOC from an adsorber which has collected the VOC in a desorption step includes: a process of introducing a gas containing at least water vapor into the adsorber from the outside of the adsorber with the use of a water vapor feeder; and a process of converting water which exists in the adsorber or has been supplied from the outside, to the water vapor by heating the adsorber. These processes can be also combined. Each of the above-described processes is appropriately selected in accordance with VOC-collecting conditions such as a type of VOC, a type of an adsorbent and a size of the adsorber.

A usable water vapor feeder has only to be a unit of changing the phase from water to water vapor, for instance, by heating water, and specifically a commercially available water vapor feeder such as a steam generator may be used. A temperature of the water vapor used then is not limited as long as it is not lower than a steam generation temperature, for instance, water vapor at 90° C. or higher can be used. A superheated steam of 100° C. or higher can be also used for the purpose of improving a desorption efficiency of a VOC from an adsorbent and reducing an amount of condensate. The temperature of the superheated steam can be appropriately selected in accordance with conditions such as a decomposition temperature of the VOC, materials of the adsorbent, an adsorber and a condenser in a subsequent stage and a heating cost, but is preferably within a range of 100° C. to 200° C.

Superheated steam can be formed by further heating water vapor generated by heating normal water to 100° C. or higher. A process for heating the water vapor can employ any commonly used process, such as a resistive heating process and an electromagnetic induction heating process.

A gas for desorption can employ singly water vapor, but may employ a gas mixture of the water vapor and another gas for the purpose of increasing desorption efficiency. Inexpensive air can be preferably selected for the gas to be introduced into the adsorber along with the water vapor, but in addition, an inert gas such as nitrogen gas can be also used. If the water vapor is cooled to condense in the adsorber or a pipe due to being mixed with another gas, the gas to be mixed with the water vapor may be previously heated, or after the water vapor has been mixed with another gas, the gas mixture may be reheated. It is also recommended to introduce another gas into a vessel for heating water in order to produce the water vapor, and heat the gas while generating the water vapor.

Water vapor and another gas can be continuously or intermittently introduced into an adsorber. If an amount of water vapor to be introduced is adjusted in accordance with an amount of a VOC to be desorbed, the VOC can be efficiently desorbed.

Figure 2:
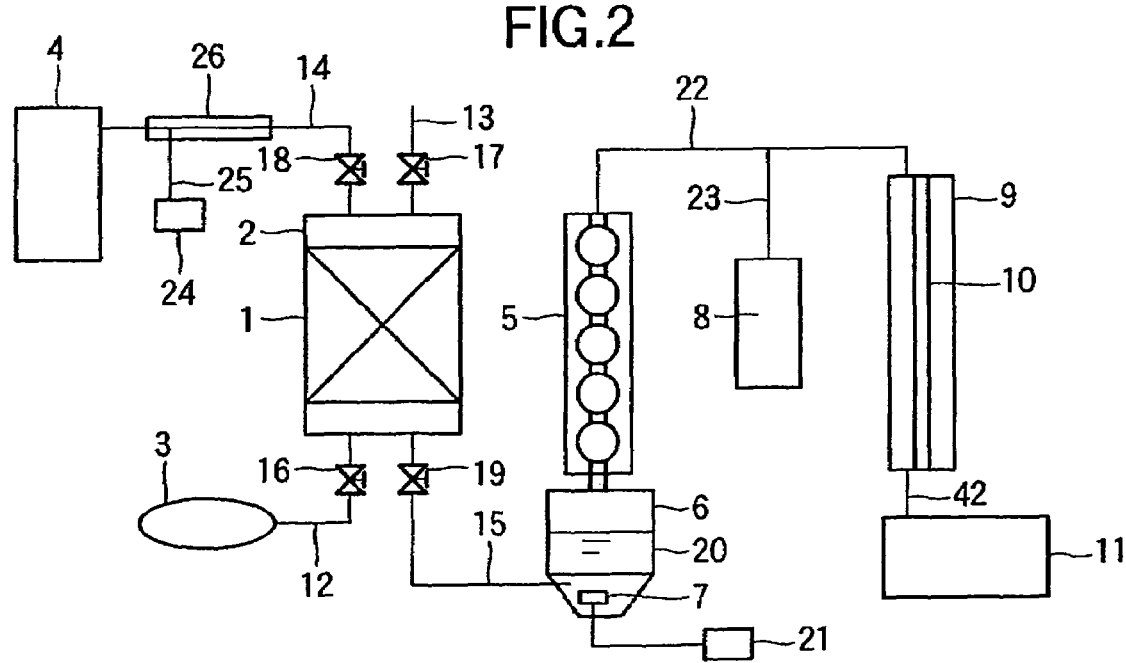
FIG. 2 is a schematic view of a decomposition treatment apparatus according to another embodiment of the present invention.

Here, when a gas mixture of water vapor and another gas is used as a gas for desorption, the gas other than except water vapor is not condensed in a condensation step, so that a step after desorption is slightly different from the above-described system. So, one example of a process of using the gas mixture of the water vapor and the other gas as the desorbed gas is shown with reference to FIG. 2 while including a subsequent step through a decomposition step.

At first, water vapor is supplied to a pipe 14 of which the valve 18 is opened from a water vapor feeder 4, and simultaneously air is supplied from a blower 24 to a pipe 14 through a pipe 25. A heating heater 26 is placed around the pipe 14 in some downstream area after a junction with the pipe 25, and heats a gas mixture of the water vapor and air in the pipe. The heated gas mixture is introduced into an adsorber 2, desorbs the VOC which has been adsorbed in an adsorbent 1, and is introduced into a condenser 5 through the pipe 15 and a receiver 6. The water vapor in the gas mixture is cooled and liquefied by the condenser 5 to be converted to condensate 20 containing the VOC, and it is stored in the receiver 6 connected to the condenser 5. The air which has not been condensed by the condenser 5 and includes the VOC, passes through the condenser 5, flows in the pipe 22, meets and is mixed with chlorine supplied from a chlorine-generating unit 8 in the pipe 22, and is introduced into the reaction tank 9. The gas mixture of air and chlorine introduced in the reaction tank 9 is irradiated with light emitted from a light-emitting unit 10, and the VOC contained in the air is thereby decomposed. The VOC in the condensate 20 is also decomposed in a similar process to the above-described one, specifically is vaporized from the condensate 20 by air blown through an air-diffusing pipe 7, is mixed with chlorine, and a decomposition step of the VOC is carried out in the reaction tank 9. Up to this point, one example of a system using the gas mixture of the water vapor and the other gas as a desorbed gas was described.

On the other hand, a process of heating an adsorber to carry out desorption utilizes that water in the adsorber is converted to water vapor by heating with a heating unit installed in the adsorber or heating, the whole adsorber, the water vapor desorbs the VOC adsorbed in an adsorbent, and the water vapor of which the volume is increased discharges, outside the adsorber. As for water in the adsorber, the water adsorbed or attached to the adsorbent and/or the adsorber can be used, or water can be supplied to the adsorber after the VOC has been collected. As for a process of supplying the water, the water can be supplied intermittently once or in several divided times or continuously before the adsorber is heated or while it is being heated, and an amount of generated water vapor can be adjusted by changing the process for supplying the water or an amount of supplied water in accordance with an amount of the desorbed VOC, which enables the VOC to be more efficiently desorbed.

A temperature to which the inner part of an adsorber or the whole adsorber is heated is not particularly limited as long as it is a temperature of changing the phase from water to water vapor, and for instance, is 90° C. or higher.

In addition, in order to increase an efficiency of desorbing a VOC from an adsorbent, generated water vapor can be converted to superheated steam by heating an adsorber to 100° C. or higher. A temperature at this time can be appropriately selected in accordance with conditions such as a temperature of decomposing the VOC, materials of an adsorbent, adsorber and a condenser in a subsequent stage and a heating cost, but is preferably in a range of 100° C. and 200° C. For desorption in the process, only water vapor generated in the adsorber may be used, but a new gas other than water vapor generated in the adsorber may be separately supplied into the adsorber from the outside in consideration of desorption efficiency. As such a gas, inexpensive air can be preferably selected for such a gas, and except for that an inert gas such as nitrogen gas can be also used. In addition, water vapor may be further supplied from the outside. If the water vapor in the adsorber is cooled by another gas supplied to the adsorber, the gas to be supplied from the outside may be heated in the adsorber by raising a heating temperature of the adsorber or adjusting an amount of the gas to be introduced into the adsorber. In addition, the gas to be supplied to the adsorber may be heated beforehand.

Figure 3:
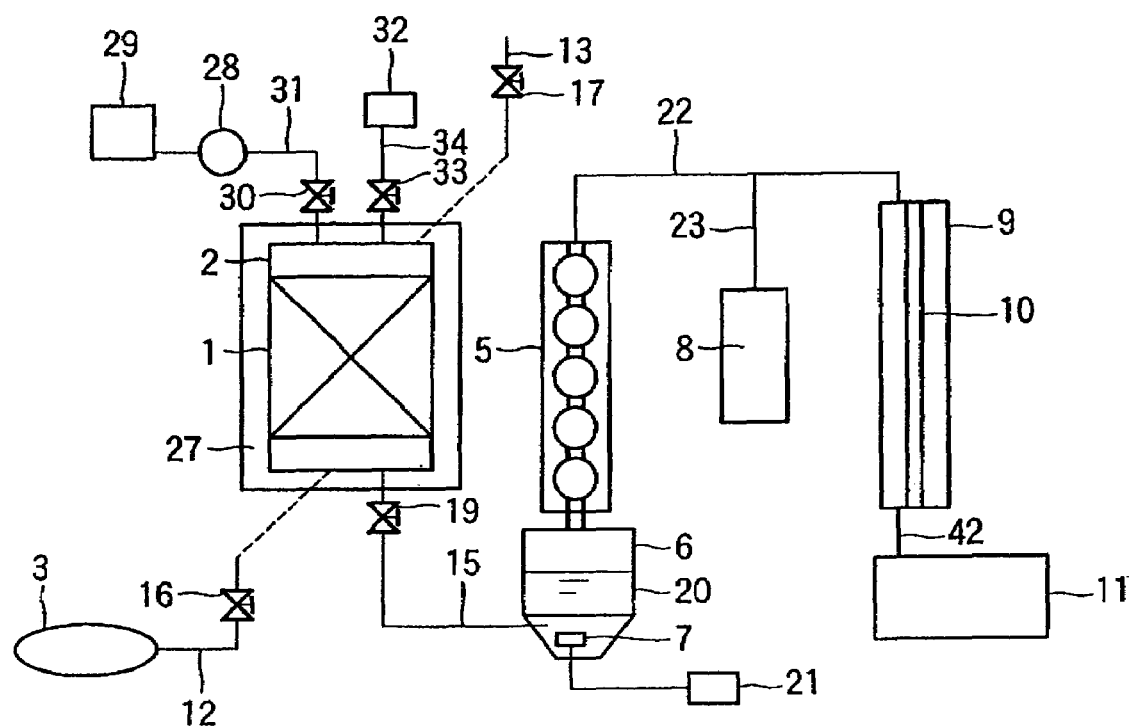
FIG. 3 is a schematic view of a decomposition treatment apparatus according to still another embodiment of the present invention.

Here, a desorbing process while heating an adsorber is illustrated in FIG. 3.

At first, pipes 12 and 13 are separated from an adsorber 2 after a VOC has been collected, and in place of them, pipes 31 and 15, and optionally a pipe 34 are connected to the adsorber 2. Subsequently, a heater 27 is installed so as to cover the adsorber 2 and heat the adsorber 2. Water adsorbed in an adsorbent 1 when the VOC has been collected becomes water vapor by heating, while desorbing the VOC from the adsorbent 1. The water vapor which has desorbed the VOC is discharged from the adsorber 2, passes through the pipe 15 and a receiver 6, is cooled by a condenser 5, and is stored in the receiver 6 in the form of condensate 20. When the adsorber 2 has finished generating the water vapor, water is supplied to the adsorber 2 at a constant rate from a tank 29 that stores water through the pipe 31 of which the valve 30 is opened, with the use of a pump 28. The supplied water becomes water vapor in the adsorber 2, which desorbs the VOC from the adsorbent and is similarly stored in the receiver 6 in the form of the condensate 20.

In addition, desorption efficiency can be enhanced by supplying air to an adsorber 2 from a blower 32 through a pipe 34 of which the valve 33 is opened, while supplying water to the adsorber 2. The air supplied to the adsorber 2 carries the water vapor which has been generated in the adsorber 2 and which has desorbed a VOC from the adsorbent 1, to the outside of the adsorber 2, and the water vapor is condensed by a condenser 5. Uncondensed air containing the VOC passes through the condenser 5, flow in a pipe 22, meets and is mixed with chlorine supplied from a chlorine-generating unit 8 through a pipe 23, in the pipe 22, and is introduced into a reaction tank 9. A gas mixture of air and chlorine introduced into the reaction tank 9 is irradiated with light emitted from a light-emitting unit 10, and thereby the VOC contained in the air is decomposed. The VOC in the condensate 20 is also decomposed in a similar process to the above-described one, specifically is vaporized from the condensate 20 by air blown through an air-diffusing pipe 7, is mixed with chlorine, and then is subjected to a decomposition step to carry out decomposition in the reaction tank 9. Up to this point, one example of a system including a step of heating the adsorber was described.

[Condensation Step]

A condensation step for cooling water vapor includes contacting a desorbed gas with a refrigerant capable of separating condensate formed by cooling; separating the formed condensate from the cooled gas; and storing it in another vessel. For instance, the condensation step includes arranging a cooling pipe having the refrigerant pass through its inner part, in a tower for passing the desorbed gas; condensing a VOC and water on the surface of the cooling pipe; and storing it in a receiver arranged in the lower part of the tower. Alternatively, the condensation step includes arranging a cooling pipe such as a coiled pipe and a ball-containing pipe in the cooling tower, passing a desorbed gas in the pipe to condense the VOC and water in the pipe, separating them against a flowing direction of the desorbed gas, and storing them in the receiver arranged in the power part of the pipe. For the refrigerant, water or an antifreezing solution is preferable used. These refrigerants are circulated in the cooling pipe or the cooling tower to cool the desorbed gas. The refrigerant can be cooled by being circulated in a liquid bath of a low and constant temperature, or by using a cooling water circulator. A cooling temperature has only to be the one capable of condensing water vapor, can be arbitrarily set according to the amount and temperature of a desorbed gas, the cooling period of time, cooling efficiency and the concentration of the VOC in a cooled gas, but is preferably, for instance, about 4° C. to 10° C., at which the condensate is not frozen.

When only water vapor is used for desorption, the most of the cooled gas does not move to a subsequent stage if the gas is condensed in a completely condensing condition, but when the used gas for desorption is a mixture of water vapor and such a gas other than water vapor as not to be condensed, the cooled but uncondensed gas naturally moves to the subsequent stage. In addition, at this time, the uncondensed gas contains a VOC though depending on the degree of condensation. Condensate consists of a liquefied VOC, water, and occasionally a used gas component other than water vapor, which is dissolved therein. The VOC exists in a state of completely being dissolved in water or being separated from water, which depends on a content ratio of the VOC to water.

[Vaporization Step]

In a vaporization step, the process of adjusting a vaporizing amount of a VOC can move the condensate having VOC accumulated in a high concentration to a reaction tank with a small amount of a gas, and can efficiently decompose the VOC.

The VOC is vaporized by the aeration of condensate. Any aerating gas is acceptable, as long as it has no problem in a VOC decomposition step in a subsequent stage, but is preferably air for instance. The amount of an aerating gas is set so as to be preferable for the concentration of the VOC in the aerating gas and the flow rate of the aerating gas, in a VOC-decomposing reaction in the subsequent decomposition step.

Since the aerating gas passes through a condenser, moves to a reaction tank in a decomposition step, it is possible to remove water vapor contained in the aerating gas to some extent by a condenser, and inhibit VOC-decomposing efficiency from being lowered by an excessive inflow of the water vapor into the reaction tank.

In addition, in order to efficiently vaporize a VOC in condensate, the condensate may be heated together with the aerating gas. The heating reduces an amount of the aerating gas, and can increase the concentration of the VOC in the aerating gas. A temperature of the heated condensate at this time has only to be appropriately set in accordance with the concentration of the VOC to be vaporized and a type of the VOC, but for instance, can be set to 30° C. to 90° C.

In addition, it is also effective to carry out a process for sufficiently vaporizing a VOC by lowering a heating temperature when the concentration of a VOC in condensate is high in the beginning of vaporization, and by heating the condensate to a higher temperature when a vaporization step for the VOC approaches the end, and the concentration of the VOC in the aerating gas become extremely low because of little VOC remaining in the condensate. In addition, the condensate may be heated when the vaporization is started, in order to vaporize a high concentration of a VOC.

A process for heating the condensate includes a process of installing a heater in a receiver which stores the condensate, and a process of having the heater built in the receiver. When a vaporization step and a desorption step are simultaneously performed, it is effective to carry out a process of heating the condensate by using water vapor which has been once used for desorption, for the purpose of aerating the condensate.

In addition, it is also preferable to control the concentration of a VOC to be vaporized by monitoring the concentration of the VOC in the aerating gas, and adjusting an amount of the aerating gas and a temperature of the condensate, according to the concentration of the VOC. Any process of monitoring the concentration of a VOC is acceptable as long as the process is used for measuring the concentration of the VOC in a gas, such as a continuous gas chromatography, a VOC sensor and a gas-detecting tube.

In addition, the condensate after having been used for a VOC-vaporizing treatment to some extent in the present step, and an aqueous solution part of the condensate separated from the VOC may be used for generating water vapor in a desorption step. This can reduce an amount of the condensate produced in a desorption step and a condensation step; and can control the excessive use of an aerating gas, because it eliminates the need of vaporizing a slight amount of the VOC contained in the condensate which has been used for vaporization treatment.

Figure 4:
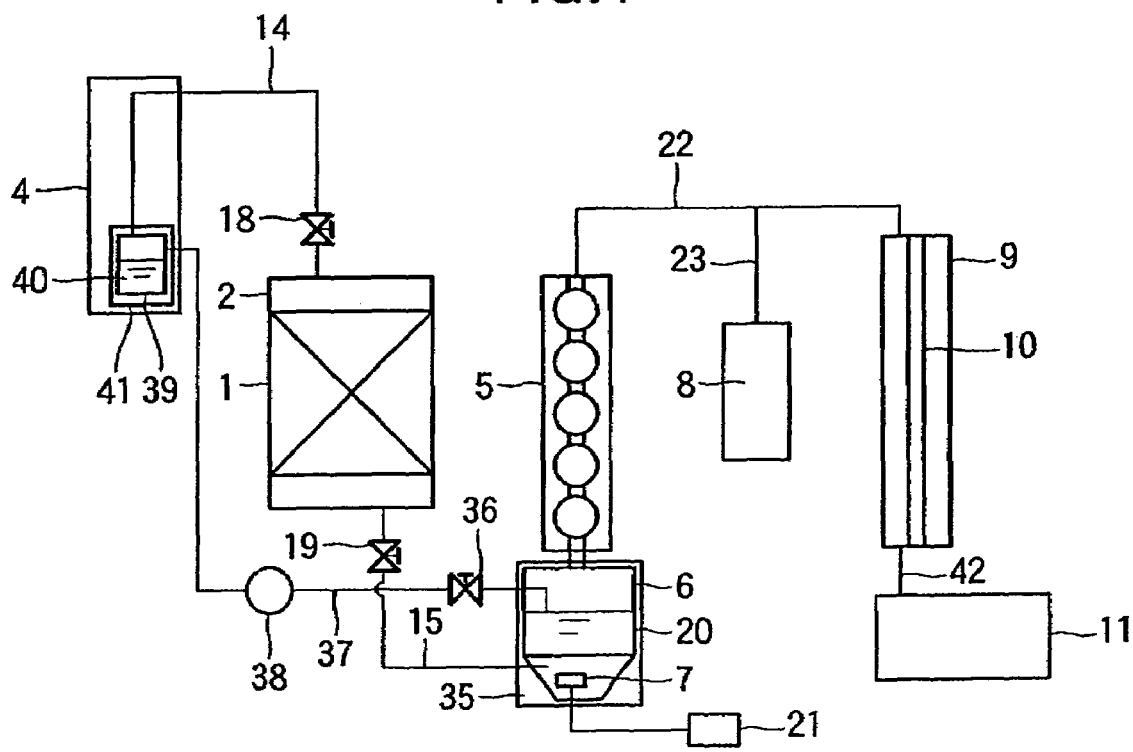
FIG. 4 is a schematic view of a decomposition treatment apparatus according to further another embodiment of the present invention.
Figure 5:
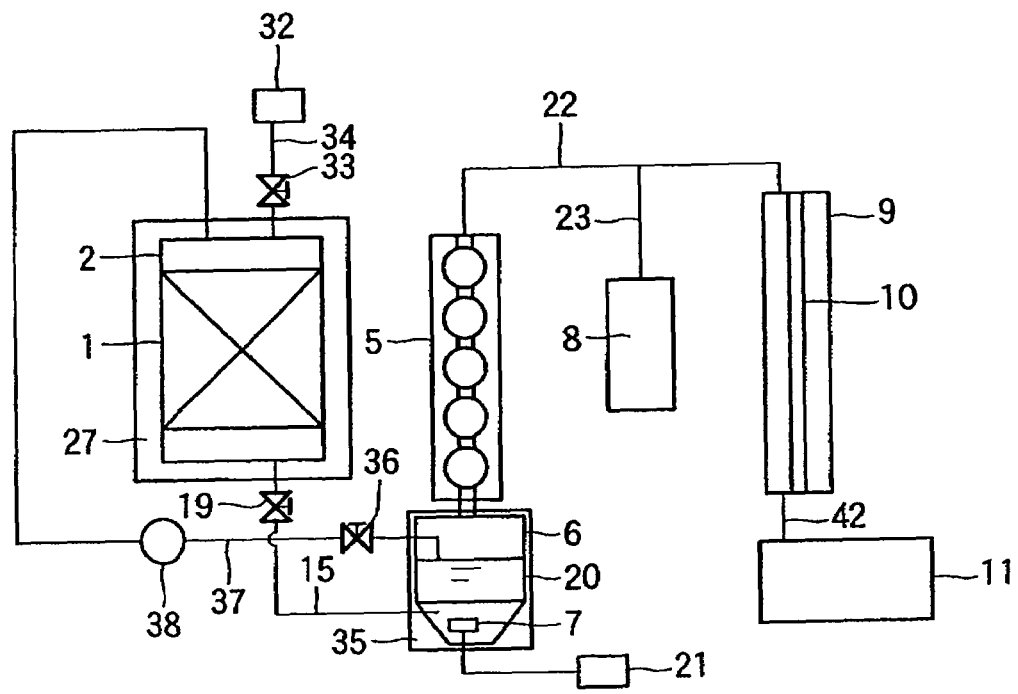
FIG. 5 is a schematic view of a decomposition treatment apparatus according to still further another embodiment of the present invention.

FIGS. 4 and 5 show the examples of configurations for the above-described vaporization step.

The condensate 20 which is stored in a receiver 6 after finishing a condensation step is aerated by air supplied by a blower 21 through an air-diffusing pipe 7, to vaporize a VOC in the condensate. An aerating gas containing the VOC passes through a condenser 5, flows in a pipe 22, and reaches a decomposition step. The concentration of the VOC in the aerating gas decreases while the aeration for the condensate 20 is continued, and then the receiver 6 is heated by a heater 35 arranged around the receiver 6. The water vapor is generated from the condensate 20 by heating and passes through the condenser 5 together with the aerating gas, but is cooled therein, is converted to water, and returns to the receiver 6 as the condensate 20. At this time, one part of the VOC is liquefied together with the water vapor, but the rest of the VOC passes through the condenser 5 in the form of a gas and reaches the decomposition step. While the above-described operations are continued, the VOC contained in the condensate 20 is approximately completely vaporized and the concentration of the VOC in the condensate 20 becomes an effluent standard value or lower. Then the condensate 20 can be disposed.

On the other hand, a system using the condensate as a feed water for a water vapor feeder is shown in FIG. 4. After a VOC has been desorbed from an adsorber 2 or while being desorbed, a valve 36 is opened, and the condensate 20 which has been stored in a receiver 6 is transferred to a tank 39 of a water vapor feeder 4 through a pipe 37 with the use of a pump 38. The VOC contained in the condensate 40 is vaporized by heating the tank 39 with a heater 41, and similarly water vapor is generated from the condensate 40. They pass through a pipe 14, and are introduced into an adsorber 2. The water vapor is used for desorbing a VOC remaining in the adsorber 2.

FIG. 5 shows a system similarly using a condensate as a feed water to be supplied to an adsorber 2 when the adsorber is heated for desorption. A valve 36 is opened, and the condensate 20 which has been stored in a receiver 6 is supplied to the adsorber 2 through a pipe 37 with the use of a pump 38. The supplied condensate is heated with a heater 27, the VOC contained in the condensate is vaporized, and water vapor is similarly generated from the condensate, which is used for desorbing a VOC remaining in the adsorber 2.

Up to this point, one example of another system including a vaporization step was described.

[Decomposition Step]

In the present VOC-decomposing step, a VOC in a gas is decomposed by irradiation with light, after a VOC-containing gas supplied from a previous step has been mixed with chlorine.

At first, the VOC-containing gas supplied from the previous step includes a gas used after aerating the condensate in the previous step, and a non-condensed gas which has been used for desorption in a VOC-desorbing step as a desorbed gas other than water vapor, and from which the water vapor has been removed in a possible extent through a condensation step.

The VOC-containing gas is mixed with chlorine right before a reaction tank. A process for mixing chlorine is not particularly specified, but may employ a process of supplying chlorine to a junction of a pipe in which the VOC-containing gas passes through.

A generating source of chlorine to be supplied is not limited in particular as long as a generating process does not have a risk, but can employ, for instance, a process of using a chlorine gas cylinder, a process of electrolyzing an electrolyte solution and a process of using an aqueous solution of hypochlorous acid.

In a process of generating chlorine by electrolysis, an aqueous solution containing a chlorine ion as in a chloride salt such as sodium chloride and potassium chloride and in hydrochloric acid, is used for an electrolyte solution. The concentration of the above electrolyte has only to be appropriately set in accordance with necessary chlorine concentration, but is preferably 0.01 to 1 mol/L. In addition, in order to increase generating efficiency for chlorine at this time, the pH of the aqueous solution may be adjusted to an acid side, preferably of 1 to 4. When electrodes are immersed in such an aqueous solution and voltage is applied, chlorine is generated at an anode. The voltage and a current to be applied have only to be preferably appropriately set in accordance with necessary chloride concentration, but are preferably about 1V to 10V and 1 A to 10 A. As for an electrode material to be used at this time, it is preferable to use titanium with high corrosion resistance. In order to efficiently supply generated chlorine into a reaction tank, an aqueous solution may be aerated with air while electrolysis is performed.

In a process of using a hypochlorous acid aqueous solution, chlorine is generated by adjusting an aqueous solution of hypochlorous acid to an acid side. In order to efficiently supply generated chlorine into a reaction tank, an aqueous solution may be aerated with air. A usable hypochlorous acid includes a hypochlorite such as sodium hypochlorite and potassium hypochlorite. The concentration of a hypochlorous acid aqueous solution can be appropriately set, but is preferable to be in a range of 1% to 20%. The pH is preferably adjusted to 1 to 4. The pH has only to be adjusted by adding inorganic acid or organic acid.

A mixed ratio of chlorine to a VOC-containing gas is determined by the concentration of the VOC in the VOC-containing gas and a dwell time of a gas mixture in a reaction tank, but for instance, when the dwell time of the gas mixture in the reaction tank is one minute and the concentration of the VOC in the gas mixture is 100 ppm or higher, the concentration of chlorine is preferably set to about 30% of the concentration of the VOC.

A process of irradiating a gas mixture of the VOC-containing gas and chlorine with light in a reaction tank consists of passing the gas mixture of the VOC-containing gas and chlorine through the reaction tank, and irradiating the gas mixture with the light emitted from a light source arranged in the reaction tank or outside the reaction tank. The light used for irradiation has preferably wavelengths of, for instance, 300 to 500 nm which can transmit in glass, and further preferably wavelengths of 350 to 450 nm. The intensity of the light is preferably set to 0.1 mW/cm$^2$ or higher.

A mechanism of decomposing the VOC is considered to be that chlorine forms a radical by irradiation with light, and the radical acts on the VOC while further forming many radical species, detaches chlorine from the VOC and oxidize the VOC.

In the present step, a reaction tank and a pipe are exposed to chlorine, light, and further radical active species, so that their materials are preferably selected from materials having resistance against them.

Up to this point, a decomposition step was described, but each step of the above-described desorption step to decomposition step can be simultaneously and continuously carried out, and the decomposition step can be started without waiting for the completion of the desorption step, which can largely shorten a period of time for regenerating an adsorbent.

[Decomposed Product Treatment Step]

The present decomposed product treatment step is a step of decomposition-treating a decomposed product formed during the decomposition of the VOC in the above-described VOC-decomposing step.

The decomposed product formed in the above-described VOC-decomposing step includes, for instance, when a substance to be decomposed is chlorinated ethylene, a chloroacetic acid such as trichloroacetic acid, dichloroacetic acid and monochloroacetic acid. The chloroacetic acid is usually a liquid at room temperature, so that the decomposed product formed in the above-described VOC-decomposing step exists in the form of a mist in a gas which has been decomposition-treated.

A decomposition treatment process can employ a process such as alkali heating and electrolysis.

Alkali heating can be performed by heating an alkaline solution in which a decomposed product has been charged. The concentration of the decomposed product in the alkaline solution at this time has only to be set normally to a range of 1,000 to 100,000 mg/L, but is preferably high from a viewpoint of decomposition efficiency. An alkali to be used is preferably sodium hydroxide; and the concentration of the alkali in a solution has only to be appropriately set in accordance with the concentration and reaction time of the decomposed product, but normally has only to be in a range of 2 to 20%. In addition, an oxidizing agent such as persulfate may be added. A heated temperature is preferably 100° C. or lower, but is usually 95° C.

Electrolysis can be performed by immersing a plurality of electrodes in an aqueous solution in which a decomposed product has been charged and applying voltage to them. The concentration of the decomposed product in the aqueous solution at this time is preferably in a range of 1,000 to 100,000 mg/L, but is preferably high from a viewpoint of decomposition efficiency. In addition, an electrolyte may be added into the aqueous solution. As for an electrode material for electrolysis, gold, silver, platinum, nickel, iron, copper, lead, an alloy thereof and stainless steel can be used. The voltage and a current applied between electrodes are not limited in particular, but are preferably set to ranges of 1 to 10 volts and 1 to 10 amperes.

By the above-described process, most of a decomposed product is completely decomposed into carbon dioxide and chlorine ion, and only a slight amount of dechlorinated organic acids such as formic acid, acetic acid and oxalic acid, according to a decomposition condition, remains as an organic matter in a solution.

A process of introducing a decomposed product into a decomposed product treatment tank includes a process of, at first, directly aerating a treated gas after a decomposition step containing the mist of the decomposed product to a treating solution in the decomposition treatment tank, thereby dissolving the decomposed product in a solution. At this time, when the decomposed product is treated by alkali heating, remaining chlorine in a treated gas can be simultaneously removed because the treating solution is alkaline, and a gas after aeration can be immediately discharged into atmospheric air. But, in this case, it should be considered that the alkaline content is consumed. When the decomposed product is treated by electrolysis, remaining chlorine in the treated gas can simultaneously removed by alkalifying the treating solution in such a range as not to aggravate the efficiency of electrolysis. In addition, on the contrary, remaining chlorine in the treated gas can be reused in a decomposition step for an objective substance after having been separated from the treated gas by acidifying the treating solution.

In addition, a decomposed product may be previously separated from a treated gas in a previous stage of a reaction product treatment tank. For instance, there is a process of aerating a collecting liquid for collecting the decomposed product to a treated gas to dissolve the decomposed product in a solution, and then adding the collecting liquid containing the decomposed product into a reacting solution for treating the decomposed product. The collecting liquid used at this time is preferably controlled to an acidic region with a pH of 5 or less, and further preferably a pH of 3 to 4, and then can collect only a decomposed product without dissolving the remaining chlorine in the treated gas. By not adjusting the collecting liquid to an excessively acidic side, it is possible to prevent reduction of the treatment efficiency for the decomposed product. As for another process for separating the remaining chlorine and the decomposed product in the treated gas, there can be a process of cooling the treated gas and condensing water vapor containing the mist of the decomposed product.

When a large amount of chlorine remains in the treated gas from which a decomposed product has been separated, the chlorine can be reused as chlorine to be used in a step for decomposing an objective substance. Thereby, an amount of chlorine generated in the VOC-decomposing treatment step is reduced, alkali consumption necessary for treating the remaining chlorine can be decreased, and the costs of the chlorine generation and the treatment for the remaining chlorine can be controlled.

A path for circulating the remaining chlorine is preferably set so that the chlorine can be used as the aerating gas in a vaporization step for condensate or in a chlorine generation tank of a decomposition step, in order not to increase an amount of a treated gas in a decomposition step. When chlorine is generated by electrolysis in a decomposition step, hydrogen generated from a cathode accumulates in a circulating gas. Thus, when chlorine is generated by circulating the remaining chlorine, it is preferable to use hypochlorous acid. As for an amount of the remaining chlorine to be circulated, the total amount is not always circulated but only one part may be circulated and the rest may be disposed.

When chlorine remains in the treated gas to be discharged after passing through each of the above-described decomposed product treatment steps, the remaining chlorine can be removed from the treated gas by aerating the treated gas in an alkaline solution, and the final treated gas can be discharged to atmospheric air.

A configuration relating to the above-described decomposed product treatment step will be described below with reference to the drawings.

Figure 6:
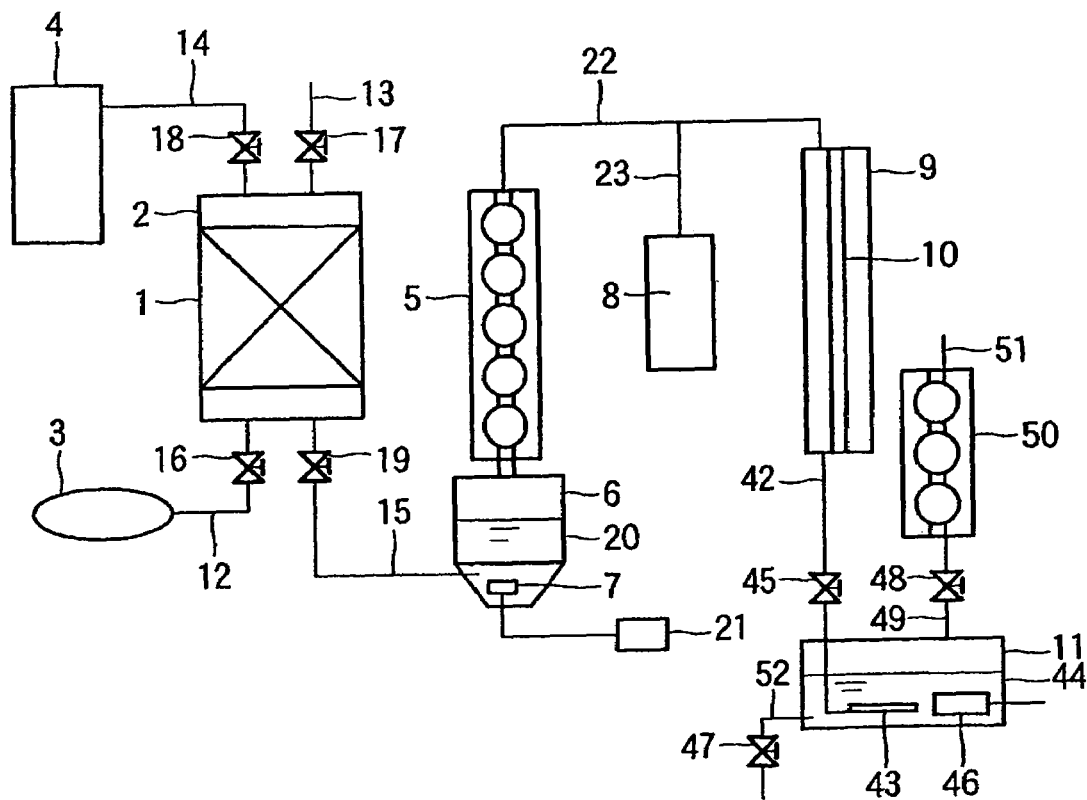
FIG. 6 is a schematic view of a decomposition treatment apparatus according to still further embodiment of the present invention.

At first, FIG. 6 shows a process of directly aerating a treated gas after a decomposition step to an alkali heating tank to dissolve a decomposed product and remaining chlorine in the treated gas into an alkaline solution, and subsequently carrying out an alkali heating treatment. The treated gas which has passed through a reaction tank 9 passes through a pipe 42, and is used for aerating the treated gas into the alkaline solution 44 in an alkali heating tank 11 through an air-diffusing pipe 43. The decomposed product and the remaining chlorine in the treated gas are dissolved in the alkaline solution 44, and the treated gas is discharged through the pipe 49 of which the valve 48 is opened, a condenser 50 and a pipe 51. In addition, a condensate which has been formed in the reaction tank 9 and contains the decomposed product, simultaneously passes through the pipe 42, and is added into the alkaline solution 44. When the decomposed product dissolved in the alkaline solution 44 becomes to have a suitable concentration, the introduction of a non-condensable gas in a desorption step as a previous stage, aeration in a vaporization step and chlorine generation in a decomposition step are stopped, the valve 45 is closed to stop the inflow of a gas through the pipe 42, then the alkaline solution 44 is heated with a heater 46, and the dissolved decomposed product is alkali-heating-treated. Water vapor is generated from the alkaline solution 44, but is cooled in a condenser 50, and the liquefied water is returned to the alkali heating tank 11 again. The alkaline solution 44 of which the decomposition efficiency is lowered through several times of alkali heating treatment is discharged from the pipe 52.

Figure 7:
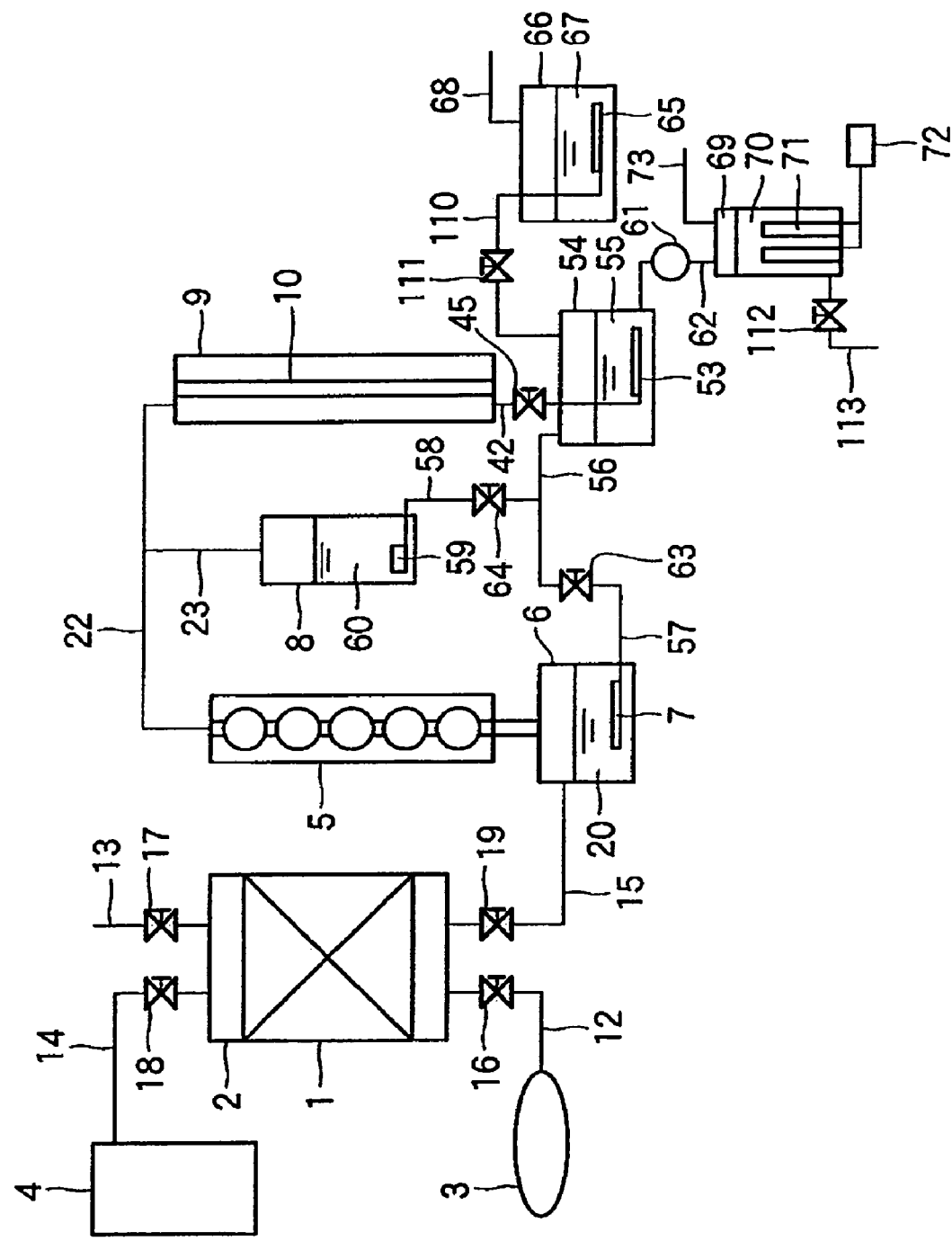
FIG. 7 is a schematic view of a decomposition treatment apparatus according to one embodiment of the present invention.

Next, FIG. 7 shows a process of separating a decomposed product from a treated gas after a decomposition step, treating it, and simultaneously returning chlorine remaining in the treated gas into a previous stage to circulate it. The treated gas which has passed through a reaction tank 9 passes through a pipe 42, and is subjected to aeration of the treated gas to an acidic solution 55 in a gas liquid separation tank 54 thereto through an air-diffusing pipe 53. The decomposed product in the treated gas is dissolved in the acidic solution 55, and the treated gas containing the remaining chlorine passes through a pipe 56 and is branched into the pipes 57 and 58. An amount of the treated gas distributed into each pipe is adjusted by valves 63 and 64. The treated gas which has passed through the pipe 57 is aerated to a condensate 20 stored in a receiver 6 through an air-diffusing pipe 53, and is used as an aerating gas for vaporizing a VOC in the condensate 20. On the other hand, the treated gas which has passed through the pipe 58 is aerated to a hypochlorite solution 60 in a chlorine-generating unit 8 through the diffusing pipe 59, and is used as a gas for sending chlorine to the pipe 22. In additions a valve 111 is properly adjusted so as to discharge a surplus gas from a pipe 110 to the outside when the volumes of gases in a circulating system loose their balance and an internal pressure increases. A discharged gas therefrom is aerated to an alkaline solution 67 in an alkali scrubber 66 through an air-diffusing pipe 65, chlorine in the gas is removed, and the resultant gas is discharged to the outside through a pipe 68. When the decomposed product dissolved in the acidic solution 55 has reached a suitable concentration, the acidic solution 55 is added into an aqueous solution 70 in an electrolysis tank 69 through a pipe 62 with the use of a pump 61. Subsequently, the decomposed product is electrolyzed by applying a voltage between two electrodes 71 from an electric source 72. The gas generated during electrolysis is discharged through a pipe 73. An aqueous solution 70 which has decomposition efficiency lowered through several times of electrolysis is discharged from a pipe 113.

Up to this point, one example of a system in a decomposed product treatment step was described.

[Traveling Type Purification Process and Vehicle-Mounted Type Decomposition Treatment Apparatus]

A traveling type VOC-decomposing system described below can be built by using a treatment process according to the present invention.

Figure 8:
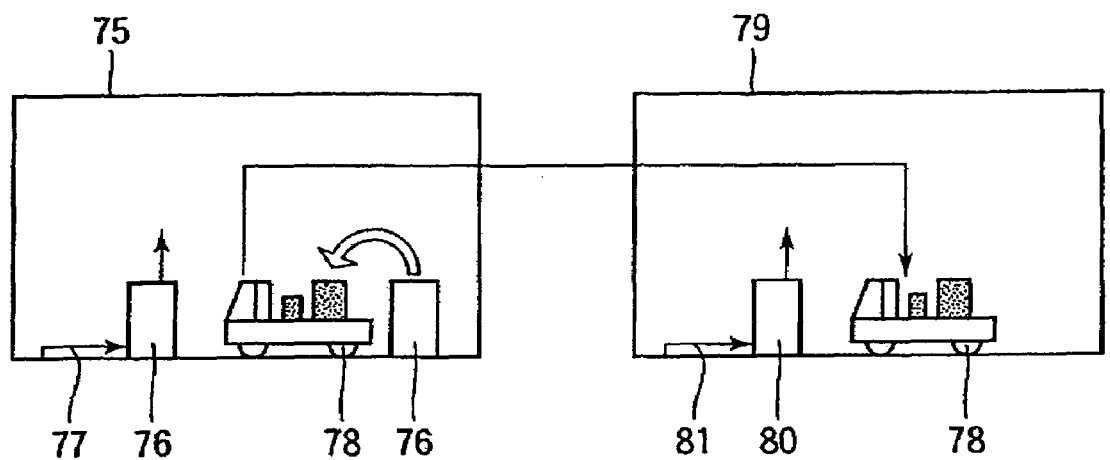
FIG. 8 is a schematic view of a vehicle mounted decomposition, treatment apparatus and a traveling type purification process according to one embodiment of the present invention.

At first, as shown in FIG. 8, an adsorber 76 is placed in a polluted site 75 in which a medium containing VOC exists, and the polluted medium 77 is passed through the adsorber 76 in order to collect the VOC therein for a predetermined period of time. On the other hand, a vehicle 78 equipped with an apparatus capable of carrying out each step of desorption for VOC, condensation, vaporization, decomposition and decomposed product treatment visits the site 75 at which the above-described adsorber 76 is placed, and each unit equipped in the vehicle 78 desorbs and decomposes the VOC collected in the adsorber 76 from the site 75. The adsorber after having finished the treatment is placed again in the site 75, and restarts collecting the VOC. While the adsorber collects the VOC for a predetermined period of time and before the vehicle 78 visits again the site for decomposition treatment, the vehicle 78 equipped with the apparatus visits another polluted site 79, and similarly treats the VOC in the adsorber 80 which has collected the VOC by passing a polluted medium 81 therethrough. While thus traveling each site, the system simultaneously implements the treatments for the VOC.

The system makes it possible to treat VOCs in a plurality of sites while using one desorption and decomposition treatment apparatus equipped on a vehicle, and can greatly reduce an apparatus cost. In addition, after treatment has been finished, the system does not transfer a collected VOC in the site to another site, and accordingly produces an effect that the regulation of PRTR (Pollutant Release and Transfer Register) does not need to be applied on it.

An example according to the present invention will be now shown below.

EXAMPLE

Figure 9:
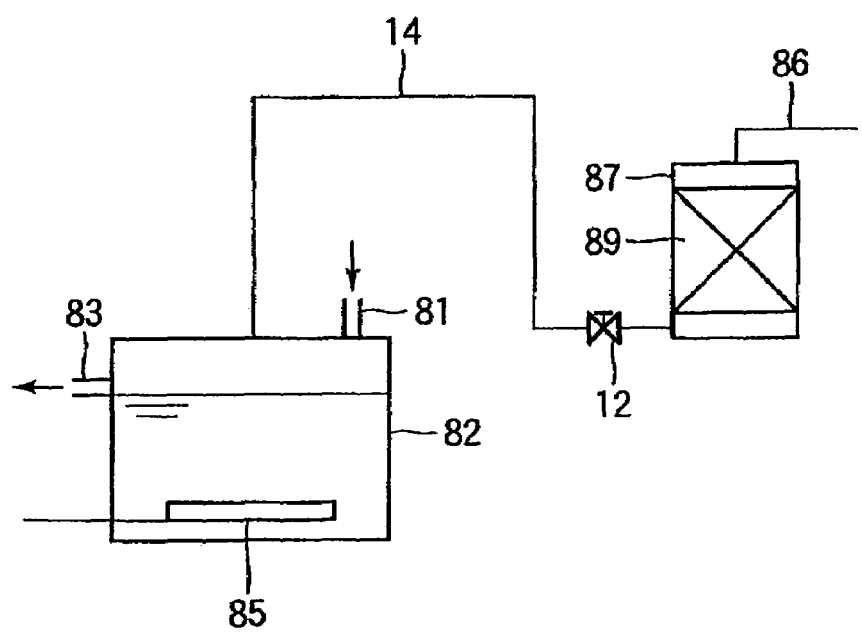
FIG. 9 is a partial schematic view of a decomposition treatment apparatus according to Example 1.
Figure 10:
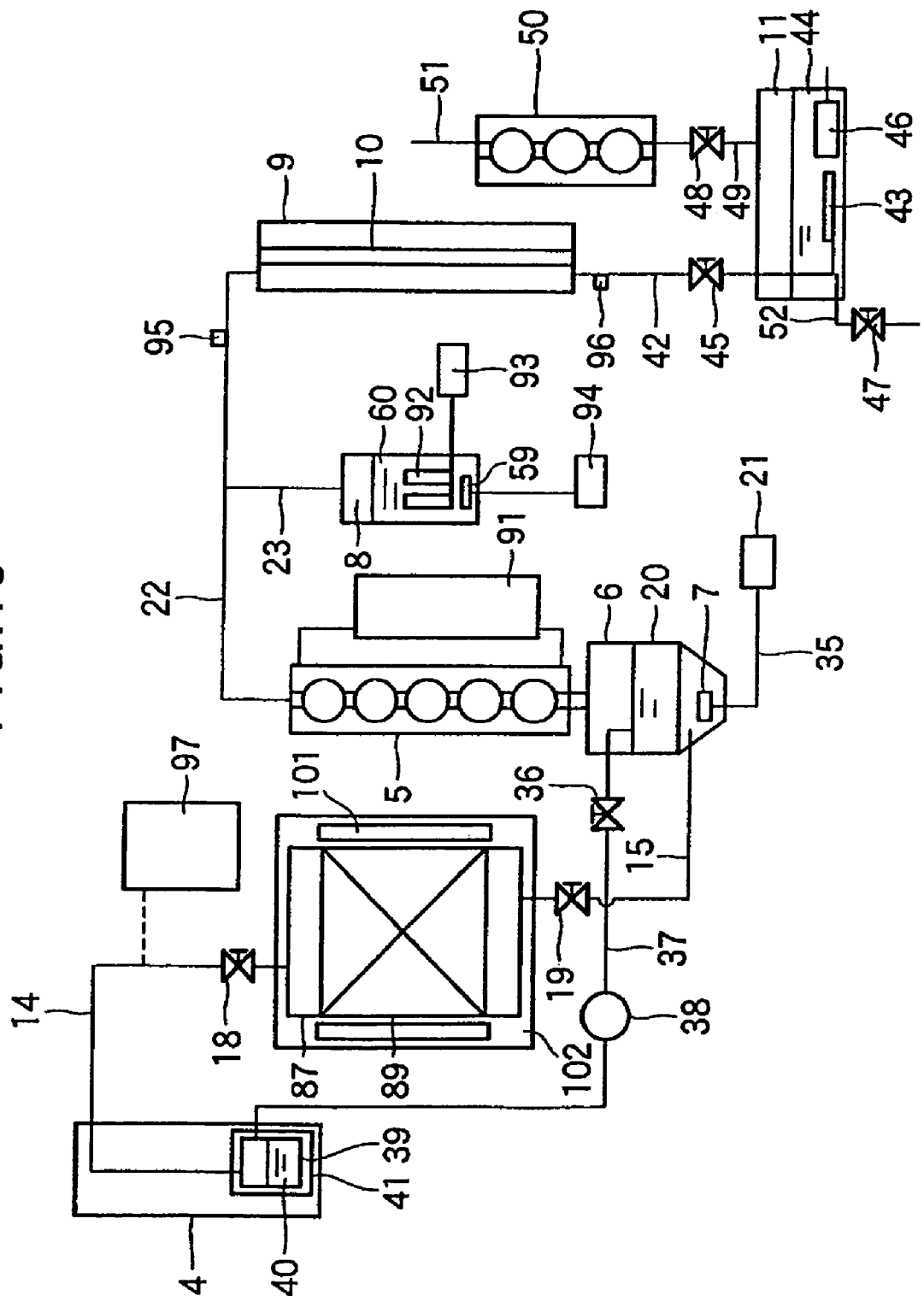
FIG. 10 is a partial schematic view of a decomposition treatment apparatus according to Example 1.

FIGS. 9 and 10 show apparatuses according to the present example.

In a site A at which soil is polluted with a VOC mainly consisting of tetrachloroethylene, polluted underground water was pumped from a well at a constant flow rate and was sent into an aeration tank 82 through a pipe 81. Aerated water was discharged from a drain pipe 83. The underground water stored therein was aerated by air sent at a rate of 1 $m^3$/min through an air-diffusing pipe 85, the gas used for aeration was introduced to a lower part of a cylindrical adsorber 87 (with a diameter of 60 cm and a height of 150 cm) filled with activated carbon 89 which was an adsorbent (Granular Shirasagi G2C4/8 made by Japan. EnviroChemicals, Ltd.), through a pipe 14, and was discharged to atmospheric air through an upper pipe 86. A VOC in the aerating gas introduced into the adsorber 87 was adsorbed by the activated carbon 89, was collected in the adsorber 87. Thus, the collecting operation was continued for 30 days. The concentration of tetrachloroethylene in the aerating gas was about 4 ppm at this time, and the concentration of tetrachloroethylene in the discharged gas was 0.1 ppm or less in the period of collecting the VOC.

When the collecting operation for the VOC was finished after 30 days, a vehicle equipped with desorption and treatment units was moved to a site A and was stopped in the vicinity of a position at which an adsorber 87 was placed. Subsequently, the pipes 14 and 86 were disconnected from the adsorber 87, and in place of them, the pipes 14 and 15 were used for respectively connecting a steam generator 4 and a receiver 6 with the adsorber 87. Furthermore, a heater 101 was wound around the adsorber 87, the whole adsorber 87 was covered with a heat-insulating material 102, and then the heater 101 was heated to 120° C. Subsequently, a vessel 39 for accommodating water for the steam generator 4 was heated to 100° C. by the heater 41, and generated water vapor was sent into the adsorber 87 through the pipe 14. The steam generator 4 was controlled so as to generate water vapor at a rate of about 5 kg/hr at this time.

Water vapor was sent into an adsorber 87, and the water vapor containing a VOC was sent into a receiver 6 from the adsorber 87 through a pipe 15, and was further moved to a condenser 5. The water vapor was liquefied by the condenser 5 to which cooling water of 4° C. was supplied from a cooling water circulator 91, and the condensate 20 was gradually stored in the receiver 6.

After one hour about 5 L of the condensate 20 was stored, and when the VOC was confirmed to be separated from water and accumulate in the bottom of a receiver 6, air was aerated at a flow rate of 10 L/min to the condensate 20 by a blower 21 through an air-diffusing pipe 7 to start vaporizing the VOC in the condensate 20.

An aerating gas containing the VOC and water vapor passed through a condenser 5, and condensed most of water vapor during the time. The VOC was also condensed together with the water vapor at a certain rate, but the VOC which was not condensed reached a pipe 22 together with the aerating gas, was mixed with chlorine introduced from a chlorine-generating unit 8 through a pipe 23, and then was introduced into a cylindrical reaction tank 9 (with a diameter of 20 cm and a length of 1 m).

A chlorine-generating unit 8 accommodated 30% aqueous solution of hydrochloric acid therein, chlorine gas was generated by electrolysis of hydrochloric acid through applying a voltage of 2.5 V between two electrode plates made of titanium arranged therein, air was aerated to the solution through an air-diffusing pipe 59 at a flow rate of 0.5 L/min to thereby supply the chlorine gas to, a pipe 22 through a pipe 23.

As a result of extracting a gas mixture in the pipe 22 at this time from a sampling opening 95, diluting it with air, and measuring the concentrations of a VOC and chlorine with a gas-detecting tube, the concentrations of tetrachloroethylene and chlorine in the gas mixture were respectively about 15,000 ppm and 5,000 ppm.

In a reaction tank 9, a black light 10 (FL10BLB made by Toshiba Corporation, 10 W, a peak wavelength of 360 nm)

installed inside it irradiated an introduced gas mixture with near ultra violet light, to decompose the VOC in the gas mixture.

As a result of extracting a treated gas having passed through a reaction tank 9 from a sampling opening 96, and measuring the concentrations of a VOC and chlorine with a gas-detecting tube, the concentrations of tetrachloroethylene and chlorine were respectively 0.1 ppm or less and 4,200 ppm.

A treated gas was aerated to an alkaline solution 44 (20% aqueous solution of sodium hydroxide) which was stored in an alkali heating tank 11 thereto through a pipe 42 and an air-diffusing pipe 53, a decomposed product and remaining chlorine were absorbed by the alkaline solution 44, and then the solution was discharged to the outside through a pipe 49, a condenser 50 and a pipe 51.

Subsequently, when condensate 20 in a receiver 6 reached about 10 L, the transfer of the condensate 20 to a tank 39 was started. A nose of a pipe 37 is perpendicularly arranged in the receiver 6 so as to contact with a liquid level when the condensate 20 reached about 10 L, and suck the condensate 20 when it exceeded 10 L. The nose of the pipe 37 is also set so that even when a granular VOC which has been separated from water and has floated in a solution by aeration is sucked together with an aqueous solution of the condensate 20, only the VOC having larger specific gravity than water can return to the receiver 6 from the pipe 37 while being sucked by a vertical part of the pipe 37. The condensate transferred red to the tank 39 was heated into water vapor by a heater 41, and was similarly used for desorption in an adsorber 87. The VOC contained in the condensate was also vaporized by heating, and was introduced into the adsorber 87 together with water vapor.

The above-described steps were continuously performed, the concentration of the VOC in a gas mixture was measured with the elapse of time by extracting the gas from a sampling opening 95 and using a detecting tube, and the concentration of chlorine generated from a chlorine-generating unit 8 was adjusted into the concentration of about 30% of the VOC concentration, by changing voltage applied between electrodes 92. The concentration of tetrachloroethylene in a gas mixture decreased with the elapse of time, and was 1 ppm or less after 16 hours. At that point in time, generation of water vapor from a steam generator 4 was stopped, and the steam generator 4 was disconnected from the pipe 14, and in place of the steam generator, the pipe 14 was connected to a fan heater 97. Subsequently, the fan heater 97 sent a hot blast of 120° C. to an adsorber 87 and dried activated carbon 89. The VOC-containing water vapor which was generated at this time was liquefied by a condenser 5 and was stored as condensate 20. The VOC contained in the condensate 20 was vaporized by aeration similarly to the above-described process, and was decomposed in a reaction tank 9. When the concentration of tetrachloroethylene in the gas mixture again reached. 1 ppm or less, all operations were stopped.

The condensate 20 remaining in a receiver 6 for a sample was extracted with hexane, and the concentration of tetrachloroethylene was measured by using ECD (Electroh Capture Detector) gas chromatography, and as a result, the concentration of tetrachloroethylene was 0.01 mg/L or less, so that the condensate 20 was discharged from the receiver 6 and was disposed.

Then a valve 45 was closed, and an alkaline solution 44 was heated to 95° C. by a heater 46 in an alkali heating tank 11, and a decomposed product dissolved therein was alkali-heating-treated. Water vapor generated from the alkaline solution 44 by heating was liquefied by a condenser 50 to which a cooling water of 4° C. was supplied from a cooling water circulator (not shown in the figure), and the condensate was returned into the tank again. By the heat treatment of two hours, the decomposed product (chloroacetic acid) in the tank reached 0.05 mg/L (detection limit) or lower, and in place of it, several milligrams per litter of formic acid and oxalic acid were produced. The treated aqueous solution was transferred to a polyethylene tank, and was finally treated as ordinary alkaline waste.

With the above, the treatment for a VOC collected in an adsorber 87 was finished. As a result of calculating a desorption rate of a VOC from the adsorber from an amount of a VOC collected in the adsorber 87 and an amount of a desorbed VOC measured at a sampling opening 95, the rate was about 54%.

The amount of a 30% hydrochloric acid solution used for generating chlorine in the present treatment was 5 L.

Next, the collection for a VOC was started again at a site A with the same process as described above, while using an adsorber 87 used at this time. While the adsorber 87 was collecting the VOC at the site A for 30 days, a vehicle equipped with a desorption treatment unit used at this time was moved to a site B at which an adsorber was collecting a VOC as in the case of the site A, and as soon as the adsorber finished collecting the VOC, the desorption treatment unit desorbed and decomposed the VOC collected in the adsorber as in the case of the site A. After the adsorber was regenerated and started collecting the VOC again at the site B, the above-described vehicle was moved to the site C at which another adsorber VOC was collecting a VOC as in the previous case, and the VOC collected in the adsorber was desorbed and decomposed as in the previous case. After the adsorber was completely regenerated and started collecting the VOC again at the site C, the above-described vehicle was moved to the site A, and as soon as the adsorber finished collecting the VOC, the VOC was desorbed and decomposed at the site A.

While a VOC was collected in a site A, the concentration of tetrachloroethylene in an aerating gas was about 4 ppm and the concentration of tetrachloroethylene in a discharged gas was 0.1 ppm or less. During decomposition of the VOC, the concentration of tetrachloroethylene in a gas mixture obtained from a sampling opening 95 was measured with a detecting tube with the elapse of time as in the above-described case, and the concentration became 1 ppm or less after 29 hours. After that, the same treatment as in the above-described case was performed, and the treatment of VOC collected in the adsorber 87 was finished. As a result of calculating a desorption rate of a VOC from the adsorber on the basis of an amount of a VOC collected in the adsorber 87 and an amount of a desorbed VOC measured at a sampling opening 95, the rate was about 106%, which proved that the VOC which had not been desorbed at a previous time was desorbed.

The amount of a 30% hydrochloric acid solution used for generating chlorine in the present treatment was 10 L.

The same adsorber 87 was used for the third time of collection for a VOC with the same process as in the above-described case, at a site A. While the adsorber was collecting the VOC at the sited A for 30 days, a vehicle equipped with a desorption treatment unit was moved again to each of sites B and C, and the VOC collected in the adsorber was desorbed and decomposed. Then, the vehicle was moved to the site A again, and as soon as the adsorber finished collecting the VOC, the VOC was desorbed and decomposed at the site A.

While the adsorber was collecting a VOC in a site A, the concentration of tetrachloroethylene in an aerating gas was about 4 ppm and the concentration of tetrachloroethylene in a discharged gas was 0.1 ppm or less. While the VOC was decomposed, the concentration of the VOC in a gas mixture obtained from a sampling opening 95 was measured with a detecting tube with the elapse of time as in the above described case, and the concentration became 1 ppm or less after 28 hours. After that, the same treatment as in the above-described case was performed, and the treatment of VOC collected in the adsorber 87 was finished. As a result of calculating a desorption rate of a VOC from the adsorber on the basis of an amount of a VOC collected in the adsorber 87 and an amount of a desorbed VOC measured at a sampling opening 95, the rate was about 102%, which proved that the VOC collected this time was approximately completely desorbed and decomposed.

The amount of a 30% hydrochloric acid solution used for generating chlorine in the present treatment was 10 L as in the second time of treatment.

From the above, it is known that a process according to the present invention can convert a large amount of, a VOC gas having a low concentration to a small amount of the VOC gas having a high concentration, and efficiently decomposes the VOC in a short time while using a small amount of chlorine. It was also confirmed that an adsorber can be sufficiently regenerated and repeatedly used. Furthermore, it was demonstrated that one treatment apparatus, which is mounted on a vehicle, can travel a plurality of polluted sites and purify the polluted substance.

This application claims priority from Japanese Patent Application No. 2004-325098 filed on Nov. 9, 2004, which is hereby incorporated by reference herein.

What is claimed is:

1. A process for treating a volatile chlorinated organic compound in which a volatile chlorinated organic compound contained in a medium is decomposed in presence of chlorine by irradiation with light, comprising:
   a collection step of passing a medium containing a volatile chlorinated organic compound through an adsorber filled with an adsorbent for adsorbing the volatile chlorinated organic compound to collect the volatile chlorinated organic compound in the adsorber;
   a desorption step of bringing a gas containing at least water vapor into contact with the adsorbent in the adsorber to desorb the volatile chlorinated organic compound from the adsorber with the collected volatile chlorinated organic compound;
   a condensation step of discharging, from the adsorber, a gas containing the water vapor and the volatile chlorinated organic compound produced in the desorption step, and subsequently cooling the gas to obtain a condensate containing the volatile chlorinated organic compound and water;
   a vaporization step of vaporizing the volatile chlorinated organic compound from the condensate;
   a decomposition step of mixing the gas containing the volatile chlorinated organic compound produced in the vaporization step with chlorine gas, and irradiating the gas mixture with light to decompose the volatile chlorinated organic compound in the gas mixture; and
   a decomposed product treatment step of carrying out decomposition treatment of a decomposed product of the volatile chlorinated organic compound generated in the volatile chlorinated organic compound decomposition step.

2. The process according to claim 1, wherein the desorption step, the condensation step, the vaporization step and the decomposition step are simultaneously and continuously carried out.

3. The process according to claim 1, wherein the gas containing at least water vapor in the desorption step is water vapor.

4. The process according to claim 1, wherein the gas containing at least water vapor in the desorption step is water vapor and air.

5. The process according to claim 3, wherein the water vapor is produced by heating water in the outside of the adsorber.

6. The process according to claim 3, wherein the water vapor is produced from water in the adsorber by heating the adsorber.

7. The process according to claim 6, wherein the water in the adsorber is water supplied to the adsorber from the outside.

8. The process according to claim 4, wherein the air is supplied from the outside.

9. The process according to claim 1, wherein the vaporization step comprises vaporizing the volatile chlorinated organic compound from the condensate by aerating the condensate.

10. The process according to claim 1, wherein the vaporization step comprises vaporizing the volatile chlorinated organic compound from the condensate by aerating and heating the condensate.

11. The process according to claim 10, wherein the heating is performed by aerating the water vapor used in the desorption step to the condensate.

12. The process according to claim 9, wherein an amount of the volatile chlorinated organic compound to be vaporized is controlled by adjusting an amount of an aerating gas in aeration of the condensate.

13. The process according to claim 11, wherein an amount of the volatile chlorinated organic compound to be vaporized is controlled by adjusting a heating amount in the heating of the condensate.

14. The process according to claim 12, wherein the amount of the volatile chlorinated organic compound to be vaporized is controlled in accordance with a concentration, measured in the vaporization step, of the gas containing the volatile chlorinated organic compound produced in the vaporization step.

15. The process according to claim 1, wherein the water vapor used in the desorption step is produced by using the condensate obtained from the vaporization step.

16. The process according to claim 1, wherein, when water vapor and air are used in the desorption step as the gas containing at least water vapor, only the water vapor is condensed in the condensation step, and the uncondensed volatile chlorinated organic compound in the air is decomposed in the decomposition step.

17. The process according to claim 1, wherein the decomposed product treatment step comprises exposing the gas after the decomposition step to an alkaline solution to dissolve the decomposed product and chlorine in the gas in the alkaline solution, and then heating the alkaline solution.

18. The process according to claim 1, wherein the decomposed product treatment step comprises separating a gas containing chlorine and the decomposed product from the gas obtained after the decomposition step, and treating the separated decomposed product.

19. The process according to claim 18, wherein the decomposed product and the gas containing chlorine are separated by cooling the gas obtained after the decomposition step, and condensing the decomposed by-product contained in the water vapor of the gas together with the water vapor.

20. The process according to claim 18, wherein the decomposed product and the gas containing chlorine are separated by aerating the gas obtained after the decomposition step to an acidic aqueous solution, and dissolving the decomposed product contained in the water vapor in the gas in the acidic aqueous solution, together with the water vapor.

21. The process according to claim 18, wherein the gas containing chlorine separated from the gas obtained after the decomposition step is used as an aerating gas in the vaporization step of the volatile chlorinated organic compound.

22. The process according to claim 1, wherein the decomposed product is treated in the decomposed product treatment step by alkali heating comprising mixing a liquid containing the decomposed product with an alkaline solution, and heating the mixed solution.

23. The process according to claim 1, wherein the decomposed product is treated in the decomposed product treatment step by electrolysis comprising applying, to the decomposed product, voltage from electrodes immersed in a liquid containing the decomposed product.

24. The process according to claim 1, wherein the medium containing the volatile chlorinated organic compound is a gas.

25. The process according to claim 24, wherein the gas is a gas generated through vacuum extraction of soil.

26. The process according to claim 24, wherein the gas is a gas generated by aerating underground water.

27. The process according to claim 24, wherein the gas is a gas generated by using a solvent containing the volatile chlorinated organic compound.

28. The process according to claim 1, wherein the medium containing the volatile chlorinated organic compound is a liquid.

29. The process according to claim 28, wherein the liquid is underground water.

30. The process according to claim 1, wherein the process for treating a volatile chlorinated organic compound comprises:
    mounting means for carrying out at least the desorption step, the condensation step, the vaporization step and the decomposition step on a vehicle;
    installing one or more of the adsorbers in one or more polluted sites at which a medium containing, the volatile chlorinated organic compound exists;
    carrying out a step of collecting the volatile chlorinated organic compound for a predetermined period of time by using the absorber,
    allowing the vehicle to visit or travel a place at which the adsorber is installed; and
    allowing respective units mounted on the vehicle to desorb and decompose the volatile chlorinated organic compound collected by the adsorber.

31. An apparatus of treating a volatile chlorinated organic compound by irradiating the volatile chlorinated organic compound contained in a medium with light in presence of chlorine to decompose the volatile chlorinated organic compound, comprising:
    a collecting means for passing a medium containing a volatile chlorinated organic compound through an adsorber filled with an adsorbent for adsorbing the volatile chlorinated organic compound to collect the volatile chlorinated organic compound in the adsorber;
    a desorption means for bringing a gas containing at least water vapor into contact with the adsorbent in the adsorber to desorb the volatile chlorinated organic compound from the adsorber with the collected volatile chlorinated organic compound;
    a condensation means for discharging, from the adsorber, the gas containing the water vapor and the volatile chlorinated organic compound produced in the desorption step and subsequently cooling the gas to obtain a condensate containing the volatile chlorinated organic compound and water;
    a vaporization means for vaporizing the volatile chlorinated organic compound from the condensate;
    a decomposition means for mixing the gas containing the volatile chlorinated organic compound produced in the vaporization step, with chlorine gas, and irradiating the gas mixture with light to decompose the volatile chlorinated organic compound in the gas mixture; and
    a decomposed product treatment means for carrying out decomposition treatment of a decomposed product of the volatile chlorinated organic compound generated by the decomposition means.

32. The apparatus according to claim 31, wherein the desorption means, the condensation means, the vaporization means and the decomposition means can be simultaneously and continuously operated.

33. The apparatus according to claim 31, wherein the adsorber is installed in a site polluted with the volatile chlorinated organic compound, and collects the volatile chlorinated organic compound for a predetermined period of time.

34. The apparatus according to claim 31, wherein the desorption means, the condensation means, the vaporization means, the decomposition means and the decomposed product treatment means are units for mounting on a vehicle.

* * * * *

UNITED STATES PATENT AND TRADEMARK OFFICE
CERTIFICATE OF CORRECTION

PATENT NO. : 7,377,959 B2
APPLICATION NO. : 11/267128
DATED : May 27, 2008
INVENTOR(S) : Shinya Kozaki et al.

It is certified that error appears in the above-identified patent and that said Letters Patent is hereby corrected as shown below:

ON TITLE PAGE AT (57) ABSTRACT

Line 4, "adsorb and desorb" should read --adsorbs and desorbs--.

COLUMN 1

Line 11, "the volatile" should read --a volatile--;
    Line 12, "a volatile" should read --the volatile--;
    Line 19, "require" should read --requires--;
    Line 21, "air environment." should read --air and environment.--;
    Line 36, "mix" should read --mixing--;
    Line 39, "poses" should read --pose--;
    Line 44, "the less" should read --the smaller--;
    Line 62, "but a low concentration of" should be deleted; and
    Line 66, "gas" should read --gas, but at a low concentration,--.

COLUMN 2

Line 12, "teethe" should read --to the--;
    Line 20, "so high" should read --such high--;
    Line 53, "finding" should read --finding.--; and
    Line 54, "provides,a" should read --provides a--.

COLUMN 4

Line 19, "vehicle mounted" should read --vehicle mounted--;
    Line 20, "position," should read --position--;
    Line 32, "be now" should read --now be--; and
    Line 41, "gas diffusing" should read --gas-diffusing--.

COLUMN 5

Line 24, "previous-step" should read --previous step--.

COLUMN 7

Line 37, "heating," should read --heating--.

UNITED STATES PATENT AND TRADEMARK OFFICE
CERTIFICATE OF CORRECTION

PATENT NO. : 7,377,959 B2
APPLICATION NO. : 11/267128
DATED : May 27, 2008
INVENTOR(S) : Shinya Kozaki et al.

It is certified that error appears in the above-identified patent and that said Letters Patent is hereby corrected as shown below:

COLUMN 8

Line 38, "flow" should read --flows--.

COLUMN 9

Line 3, "preferable" should read --preferably--; and
Line 14, "the most" should read --the majority--.

COLUMN 12

Line 17, "oxidize" should read --oxidizes--.

COLUMN 13

Line 25, "can" should read --can be--.

COLUMN 14

Line 31, "becomes to have" should read --reaches--;
Line 50, "gas liquid" should read --gas-liquid--;
Line 64, "additions" should read --addition,--; and
Line 67, "loose" should read --lose--.

COLUMN 15

Line 51, "be" should read --now be--; and
Line 52, "now" should be deleted.

COLUMN 16

Line 2, "Japan." should read --Japan--;
Line 6, "was" should read --and was--;
Line 36, "hour" should read --hour,--;
Line 43, "water" should read --the water--; and
Line 57, "gas to, a" should read --gas to a--.

UNITED STATES PATENT AND TRADEMARK OFFICE
CERTIFICATE OF CORRECTION

PATENT NO. : 7,377,959 B2
APPLICATION NO. : 11/267128
DATED : May 27, 2008
INVENTOR(S) : Shinya Kozaki et al.

It is certified that error appears in the above-identified patent and that said Letters Patent is hereby corrected as shown below:

COLUMN 17

Line 29, "transferred red" should read --transferred--;
    Line 55, "reached." should read --reached--; and
    Line 58, "(Electroh" should read --(Electron--.

COLUMN 18

Line 6, "per litter" should read --per liter--; and
    Line 61, "sited A" should read --site A--.

COLUMN 19

Line 22, "amount of, a" should read --amount of a--.

COLUMN 21

Line 47, "containing," should read --containing--; and
    Line 52, "travel" should read --travel to--.

Signed and Sealed this

Thirtieth Day of December, 2008

JON W. DUDAS
*Director of the United States Patent and Trademark Office*